United States Patent [19]
Carrico

[11] 3,946,177
[45] Mar. 23, 1976

[54] LIQUID-LEVEL SENSOR UTILIZING FERROMAGNETIC FLUID

[75] Inventor: John Paul Carrico, Royal Oak, Mich.

[73] Assignee: The Bendix Corporation, Southfield, Mich.

[22] Filed: Feb. 25, 1975

[21] Appl. No.: 552,827

[52] U.S. Cl. .................. 200/84 C; 335/2; 335/56; 73/313
[51] Int. Cl.² .................................. H01H 35/18
[58] Field of Search .......... 335/2, 51, 56; 200/84 C; 73/71.2, 313

[56] References Cited
UNITED STATES PATENTS

| 3,555,221 | 1/1971 | Booth | 200/84 C |
| 3,826,139 | 7/1974 | Bachman | 200/84 C X |
| 3,839,904 | 10/1974 | Stripling et al. | 73/71.2 |

OTHER PUBLICATIONS
Francis J. Lavoie, "Magnetic Fluids Engineering Kit and Application Sketches," 6/14/74, Ferrofluids Corp., Burlington, Mass.

Primary Examiner—G. Harris
Attorney, Agent, or Firm—Lester L. Hallacher

[57] ABSTRACT

The invention is directed to a liquid-level sensor utilizing a ferromagnetic fluid. The magnetic characteristics of the fluid are utilized in a magnetic circuit which generates the output signal and are also useful in the mechanical operation of the sensor. The magnetic characteristics of the ferromagnetic fluid, therefore, serve a twofold purpose in the inventive sensor.

5 Claims, 1 Drawing Figure

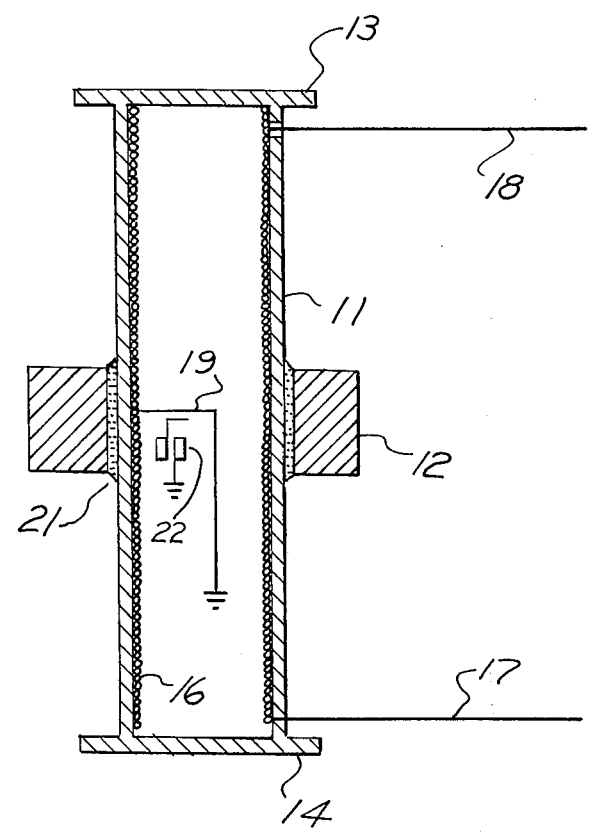

LIQUID-LEVEL SENSOR UTILIZING FERROMAGNETIC FLUID

BACKGROUND OF THE INVENTION

Various forms of liquid level sensors utilizing float actuated mechanisms are presently available in the art. In one such sensor a ring is coaxially disposed about a cylindrical member. Either the annular member or the cylindrical member can be mechanically fixed so that the other member is free to move with respect to the fixed member. The entire device is then submerged into the liquid, the level of which is to be measured and the fixed member remains stationary irrespective of the level of the liquid. However, the other member floats so that the relative positions of two members change and these changes are detected as an indication of the level of liquid. Because the two members must move relative to one another, it is necessary that there be clearance space between the two members. This creates a problem at low temperatures because the fluid, the level of which is being measured, fills the space between the two members and because the fluid tends to become viscous at low temperatures, the relative movement of the two members is impeded. The sticking problem at low temperatures can be partially alleviated by increasing the spacing between the two members. However, disadvantages arise from the increased spacing. For example, the accuracy of the sensor is decreased because the larger spacing allows a greater latitude of transverse movement between the two elements so that the repeatability of the sensor is substantially decreased. Also, in sensors utilizing magnets and a magnetic circuit, the increased spacing results in the requirement for a much stronger magnet and the accuracy of the device is decreased because of the increased fringing of the magnetic field.

SUMMARY OF THE INVENTION

The invention is directed to a sensor which alleviates the above enumerated problems. In the invention a ring magnet or toroid is coaxially disposed with respect to a closed right cylinder. The relative movement of the ring magnet and cylinder is indicative of the level of fluid in which the sensor is submerged. Magnetic detecting means are enclosed within the cylinder to yield an output signal representative of the liquid level. The fluid being measured is prohibited from entering the clearance space between the toroid and cylinder by a ferromagnetic fluid which is used to fill the space. Because the fluid is ferromagnetic, it is held in the space between the two members by the magnetic field of the ring magnet. Ferromagnetic fluids are a colloidal suspension of ferric particles in an appropriate carrier solution. Typically, the carrier solution is a dielectric, such as kerosene, and accordingly, the fluid acts as an excellent lubricant. A detailed description of such fluids is found in an article entitled "Magnetic Fluids" by R. E. Rosenweig, published in International Science and Technology, July 1966, at pages 48 through 56. The space between the magnet and cylinder can be maintained very small because the ferromagnetic fluid acts as a lubricant between the two moving members. The accuracy of the device, therefore, is substantially increased. Also, because the ferromagnetic fluid is selected so that it has adequate viscosity at low temperatures, the sticking problem mentioned hereinabove is totally eliminated. It must be recognized, however, that the ferromagnetic fluid must be one which will not be soluable in, or react with, the fluid, the level of which is being measured.

BRIEF DESCRIPTION OF THE DRAWING

The FIGURE is a preferred embodiment of the invention.

DETAILED DESCRIPTION OF THE INVENTION

The preferred embodiment shown in the FIGURE includes a closed cylindrical Container 11 coaxially disposed within a ring magnet or Toroid 12. Casing 11 and Toroid 12 are free to move relative to one another. The relative movement is restrained by Flanges 13 and 14, respectively, disposed on ends of Casing 11 to retain Casing 11 within Toroid 12.

The spacing between Casing 11 and Ring Magnet 12 is filled with a Ferromagnetic Fluid 21. The Fluid 21, therefore, serves as a lubricant to assist in the relative movement of Casing 11 and Ring Magnet 12 and also prevents transverse movement of the two members so that the accuracy of the device is quite high. Ring Magnet 12 is a permanent magnet, and therefore, Fluid 21 is maintained within the spacing by the magnetic flux of the magnet. Accordingly, as relative movement between Magnet 12 and Casing 11 occurs, the ferromagnetic fluid moves along with the magnet. As is known to those skilled in the art, a ferromagnetic fluid is a colloidal suspension of submicron ferrite particles in a suitable carrier fluid. Such fluids behave as fluids per se under all conditions. However, because of the ferrite particles, the fluids are responsive to magnetic fields.

A sensing means is enclosed in Casing 11 so that the relative position of Ring Magnet 12 with Casing 11 is sensed. As an example, the sensing mechanism can include a Coil 16 which is coaxially disposed with respect to Casing 11. Coil 16 is provided with three output Leads 17, 18, and 19. A suitable AC or DC energizing source can be used to create a magnetic field for Coil 16. Accordingly, as Ring Magnet 12 moves with respect to Casing 11 and Coil 16, the magnetic field of the coil is changed and the change can be detected across the Leads 17, 18, and 19, giving an indication of the relative position of the two members. As an example, Lead 19, which represents a center tap of Coil 16, can be grounded. Accordingly, as Ring Magnet 12 changes position with respect to the grounded lead, the polarity and value of signal present across Leads 18 and 17 will be indicative of the location of Ring Magnet 12 with respect to Center Lead 19. The output Leads 17, 18, and 19 can be coupled to any suitable detecting circuitry, such as differential transformers or bridge network, to directly indicate the position of Ring Magnet 12 with respect to Center Tap 19. Also, if desired, other magnetic detecting means can be used, such as for example, magnetic responsive reed switches 22, Hall-effect switches, and other detecting means.

In operation, the entire sensor is submerged in the liquid, the level of which is to be measured. Either the Casing 11 or Ring Magnet 12 will be permanently affixed within the container so that relative movement between the fixed member and the container cannot occur. The other member will be free to move with respect to the fixed member and will float in the liquid in accordance with the level thereof. As an example, if Ring Magnet 12 is fixed within the liquid container, Casing 11 is free to move linearly with respect to Magnet 12. Accordingly, the level of liquid will determine the position of Casing 11 with respect to Magnet 12 and be a direct indication of the level of liquid within the container. As the liquid level varies, the relative position of Casing 11 and Ring Magnet 12 will vary, thereby directly indicating the level of fluid within the container.

Because of the magnetic characteristics of Ferromagnetic Fluid 21 within the spacing between Casing 11 and Ring Magnet 12 as the two members move relative to one another, Fluid 21 will move with Magnet 21, thereby remaining within the spacing. The presence of the ferromagnetic fluid within the spacing prevents the ingress of the liquid, the level of which is being measured, into the space so that the viscosity changes due to temperature changes and the attendant sticking are substantially eliminated. Also, because of the presence of Fluid 21, the spacing can be relatively small so that the relative transverse movement of Casing 11 and Ring Magnet 12 is substantially decreased and greatly improved repeatability of measurements is achieved.

I claim:

1. A liquid level detector comprising:
   a magnetic member;
   a casing member, said magnetic member and said casing member being arranged for relative movement and having a clearance space between said members;
   a ferromagnetic fluid disposed in said clearance space and retained by the magnetic field of said magnetic member; and
   sensor means supported by said casing member for providing a signal representative of the relative position of said members.

2. The detector of claim 1 wherein said casing member is cylindrical and said magnetic member is a toroid coaxially disposed with respect to said casing member so that relative movement of said members occurs along the longitudinal axis of said casing member.

3. The detector of claim 2 wherein said sensor means includes a coil coaxially disposed with respect to said casing member so that relative movement of said members changes the magnetic characteristics of said coil to provide an output signal representative of said relative movement.

4. The detector of claim 3 wherein said coil is center tapped and said center tap is grounded.

5. The detector of claim 2 wherein said sensor means includes a magnetic field responsive switch.

* * * * *